(12) United States Patent
Park et al.

(10) Patent No.: US 8,470,901 B2
(45) Date of Patent: Jun. 25, 2013

(54) ORGANIC AEROGEL AND COMPOSITION AND METHOD FOR MANUFACTURING THE ORGANIC AEROGEL

(75) Inventors: Sang-Ho Park, Yongin-si (KR); Sung-Woo Hwang, Yongin-si (KR); Myung-Dong Cho, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 187 days.

(21) Appl. No.: 12/886,313

(22) Filed: Sep. 20, 2010

(65) Prior Publication Data

US 2011/0071231 A1 Mar. 24, 2011

(30) Foreign Application Priority Data

Sep. 24, 2009 (KR) .................. 10-2009-0090718

(51) Int. Cl.
*B32B 3/26* (2006.01)
*C08J 9/00* (2006.01)

(52) U.S. Cl.
USPC ............. 521/149; 521/61; 521/63; 521/99; 521/142; 521/147; 521/64

(58) Field of Classification Search
USPC ............. 521/149, 61, 64, 77, 99, 142, 146, 521/147
See application file for complete search history.

(56) References Cited

U.S. PATENT DOCUMENTS

| | | | |
|---|---|---|---|
| 3,549,481 A | 12/1970 | Cesare et al. | |
| 4,873,218 A | 10/1989 | Pekala | |
| 4,966,919 A | 10/1990 | Williams, Jr. et al. | |
| 4,997,804 A | 3/1991 | Pekala | |
| 5,124,364 A | 6/1992 | Wolff et al. | |
| 5,137,927 A | 8/1992 | Wolff et al. | |
| 5,159,049 A | 10/1992 | Allen | |
| 5,389,288 A | 2/1995 | Rindo et al. | |
| 5,420,168 A | 5/1995 | Mayer et al. | |
| 5,484,818 A | 1/1996 | De Vos et al. | |
| 5,508,341 A | 4/1996 | Mayer et al. | |
| 5,945,084 A | 8/1999 | Droege | |
| 5,948,879 A | 9/1999 | Mori et al. | |
| 5,990,184 A | 11/1999 | Biesmans | |
| 6,040,375 A | 3/2000 | Behme et al. | |
| 6,316,092 B1 | 11/2001 | Frank et al. | |
| 6,887,563 B2 | 5/2005 | Frank et al. | |
| 7,118,801 B2 | 10/2006 | Ristic-Lehmann et al. | |
| 7,282,466 B2 | 10/2007 | Long et al. | |
| 7,316,919 B2 | 1/2008 | Childs et al. | |
| 2001/0038933 A1 | 11/2001 | Gebhardt et al. | |
| 2002/0173554 A1 | 11/2002 | Baumann et al. | |
| 2004/0063035 A1* | 4/2004 | Nagano et al. ............ | 430/283.1 |
| 2004/0142149 A1 | 7/2004 | Mollendorf et al. | |
| 2005/0131089 A1 | 6/2005 | Kocon et al. | |
| 2007/0036959 A1 | 2/2007 | Yamato et al. | |
| 2007/0087120 A1 | 4/2007 | Connors, Jr. et al. | |
| 2007/0167534 A1 | 7/2007 | Coronado et al. | |
| 2007/0208124 A1 | 9/2007 | Schiraldi et al. | |
| 2007/0259169 A1 | 11/2007 | Williams et al. | |
| 2008/0087870 A1 | 4/2008 | Williams et al. | |
| 2008/0112876 A1 | 5/2008 | Dailey | |
| 2008/0188581 A1 | 8/2008 | Lee et al. | |
| 2008/0220333 A1 | 9/2008 | Yano et al. | |
| 2008/0287561 A1 | 11/2008 | Menashi et al. | |
| 2009/0029147 A1 | 1/2009 | Tang et al. | |
| 2009/0035344 A1 | 2/2009 | Thomas et al. | |
| 2010/0204347 A1 | 8/2010 | Park et al. | |
| 2011/0201713 A1* | 8/2011 | Kim et al. .................. | 521/147 |
| 2011/0245361 A1* | 10/2011 | Kim et al. .................. | 521/147 |
| 2011/0311802 A1* | 12/2011 | Cho et al. .................. | 428/316.6 |

FOREIGN PATENT DOCUMENTS

| | | | |
|---|---|---|---|
| CN | 101525248 | * | 4/2009 |
| DE | 1964188 A1 | | 7/1970 |
| EP | 0994912 A | | 1/1994 |
| EP | 0995773 | * | 10/1999 |
| JP | 4732742 A | | 11/1972 |
| JP | 05-319899 A | | 12/1993 |
| JP | 2000-119433 A | | 4/2000 |
| JP | 2008132676 A | | 6/2008 |
| JP | 2008221385 A | | 9/2008 |
| JP | 2008231258 A | | 10/2008 |
| KR | 19967003975 A | | 8/1996 |
| KR | 1019990044531 A | | 6/1999 |
| KR | 10-0282964 B1 | | 12/2000 |
| KR | 1020010017538 A | | 3/2001 |
| KR | 1020040011915 A | | 2/2004 |
| KR | 1020040106289 A | | 12/2004 |
| KR | 1020050037557 A | | 4/2005 |
| KR | 1020050073500 A | | 7/2005 |
| KR | 1020050118119 A | | 12/2005 |

(Continued)

OTHER PUBLICATIONS

Chowdhury, R. "Electron-Beam-Induced Crosslinking of Natural Rubber/Acrylonitrile-Butadiene Rubber Latex Blends in the Presence of Ethoxylated Pentaerythritol Tetraacrylate Used as a Crosslinking Promoter" Journal of Applied Polymer Science, vol. 103, pp. 1206-1214.*

Husing, N.; Shubert, U. "Aerogels—Airy Materials: Chemistry, Structure, and Properties" Angew. Chem. Int. Ed. 1998, 37, pp. 22-45.*

Science Magazine, Editor's Choice Section, "Materials Science Spongy Clay?", Oct. 21, 2005, vol. 310; 5747, pp. 407-408.

European Extended Search Report—EP 10191930.6 dated May 11, 2011.

Aaltonen, O. et al., The preparation of lignocellulosic aerogels from ionic liquid solutions, Carbohydrate Polymers, 2009, vol. 75: 125-129.

Al-Muhtaseb, S.A. et al., Preparation and Properties of Resorcinol-Formaldehyde Organic and Carbon Gels, Advanced Materials, 15, 101-114 (2003).

(Continued)

*Primary Examiner* — Randy Gulakowski
*Assistant Examiner* — Christina Wales
(74) *Attorney, Agent, or Firm* — Cantor Colburn LLP (57) ABSTRACT

A composition for manufacturing an organic aerogel including at least one monomer having at least two substituted or unsubstituted acrylamide groups and a solvent is provided, along with an organic aerogel including a polymeric reaction product of the monomer or monomers.

17 Claims, 3 Drawing Sheets

FOREIGN PATENT DOCUMENTS

| KR | 1020060099514 A | 9/2006 |
|---|---|---|
| KR | 10-0666110 B1 | 1/2007 |
| KR | 1020090059321 A | 6/2009 |
| KR | 1020090061301 A | 6/2009 |
| KR | 10-0911845 B | 8/2009 |
| WO | 96/26915 A1 | 9/1996 |
| WO | 2008104491 A1 | 9/2008 |
| WO | 2008114524 A1 | 9/2008 |
| WO | 2009033070 A1 | 3/2009 |

OTHER PUBLICATIONS

Aoki, H. et al., Basic Study of the Gelation of Dimethacrylate-Type Crosslinking Agents, J. of Polymer Sci Part A: Polymer Chem, 2006, 44: 949-958.

Capadona, L. A. et al., Flexible, Low-Density Polymer Crosslinked Silica Aerogels. Polymer, 2006; vol. 47: 5754-5761.

Chowdhury, R., Electron-Beam-Induced Crosslinking of Natural Rubber/Acrylonitrile•Butadiene Rubber Latex Blends in the Presence of Ethoxylated Pentaerythritol Tetraacrylate Used as a Crosslinking Promoter, J. of Applied Polymer Sci, 2007, vol. 103 (2): 1206-1214.

EP Extended Search Report for Application No. 11170821.0 dated Nov. 30, 2011.

EP Search Report for Application No. 11158144.3 dated Jul. 29, 2011. All references listed above are cited therein.

Feldmann C., "Polyol-Medicated Synthesis of Nanoscale Functional Materials", Advanced Functional Materials, 2003, vol. 13(2): 101-107.

Fischer, F. et al., Cellulose-based aerogels, Polymer, 2006, vol. 47: 7636-7645.

Gavillon, R. et al., Aerocellulose: New Highly Porous Cellulose Prepared from Cellulose-NaOH Aqueous Solutions, Biomacromolecules, 2008, vol. 9: 269-277.

Gu, W. et al., Polymerized Gels and 'Reverse Aerogels' from Methyl Methacrylate or Styrene and Tetraoctadecylammonium Bromide as Gelator, Chem. Commun. 1997, 6, pp. 543-544.

Hebb, A. et al., Synthesis of porous cross-linked polymer monoliths using 1,1,1,2-tetrafluoroethane (R134a) as the porogen, Composites Science and Technology, 2003, vol. 63: 2379-2387.

Hoepfner, S. et al., Synthesis and characterisation of nanofibrillar cellulose aerogels, Cellulose, 2008, vol. 15: 121-129.

Husing, N. et al., "Aerogels—Airy Materials: Chemistry, Structure, and Properties", Angew. Chem. Int. Ed., 1998, vol. 37: 22-45.

Iler, R.K.,1978. "The Chemistry of Silica", John Wiley & Sons, New York.

Innerlohinger, J. et al., Aerocellulose: Aerogels and Aerogel-like Materials made from Cellulose, Macromol. Symp., 2006, vol. 244: 126-135.

Jin, H. et al., Nanofibrillar cellulose aerogels, Colloids and Surfaces A: Physicochem. Eng. Aspects, 2004, vol. 240 (1-3): 63-67.

Jirglova, H. et al., Synthesis and Properties of Phloroglucinol-Phenol-Formaldehyde Carbon Aerogels and Xerogels, Langmuir, 2009; 25(4): 2461-2466.

Kaczmarek, H. et al., Networks of Photocrosslinked Poly(meth)acrylates in Linear Poly(vinyl chloride), Networks of, J. Appl. Polym. Sci., 2002, 86, 375-3734.

Kanamori, K. et al., New Transparent Methylsilsesquioxane Aerogels and Xerogels with Improved Mechanical Properties, Advanced Materials, 2007, vol. 19(12): 1589-1593.

Katanyoota, P. et al., Novel polybenzoxazine-based carbon aerogel electrode for supercapacitors, Materials Science and Engineering: B, 2010, vol. 167(1): 36-42.

Leventis, N. et al., Nanoengineering Strong Silica Aerogels, Nano Letters, 2002, vol. 2 (9): 957-960.

Leventis, N., Three-Dimensional Core-Shell Superstructures: Mechanically Strong Aerogels, Acc. Chem. Res. 2007, 2007, 40 (9): 874-884.

Liebner, F. et al., Cellulose aerogels: highly porous, ultra-lightweight materials, Holzforschung, 2008, vol. 62: 129-135.

Liebner, F. et al., Cellulosic aerogels as ultra-lightweight materials. Part 2: synthesis and properties, Holzforschung, 2009, vol. 63: 3-11.

Long, D. et al. "Molecular design of polymer precursors for controlling microstructure of organic and carbon aerogels", Journal of Non-Crystalline Solids, 2009,: vol. 355(22-23): 1252-1258.

Lorjai, P. et al., "Porous Structure of Polybenzoxazine-based organic aerogel prepared by sol-gel process and their carbon aerogels", J Sol-Gel Sci Technol, 2009, vol. 52(1): 56-64.

Mulik, S. et al, Cross-Linking 3D Assemblies of Nanoparticles into Mechanically Strong Aerogels by Surface-Initiated Free-Radical Polymerization, Chem. Mater., 2008, 20 (15): 5035-5046.

Mulik, S. et al., Time-Efficient Acid-Catalyzed Synthesis of Resorcinol-Formaldehyde Aerogels, Chem. Mater., 2007, 19, pp. 5138-6144.

Paguio, R.R. et al., Fabrication Capabilities for Spherical Foam Targets Used in ICF Experiments,17th Target Fabrication Specialist Meeting, San Diego, CA, Oct. 1-5, 2006. Also published on IEEE Xplore.

Pekala, R. W. et al., "Structure of organic aerogels 1. Morphology and scaling", Macromolecules 26 (1993): 5487-5493.

Pekala, R.W. "Organic aerogels from the polycondensation of resorcinol with formaldehyde", Journal of Materials Science, 1989, 24(9): 3221-3227.

Rozenberg, B.A. et al., "High-performance Bismaleimide Matrices: Cure Kinetics and Mechanism" Polymers for Advanced Technologies, 2002, vol. 13 (10-12): 837-844.

Tan, C. et al., Organic Aerogels with Very High Impact Strength, Advanced Materials, 2001, vol. 13 (9): 644-646.

Wiener, M. et al., "Carbon Aerogel-Based High-Temperature Thermal Insulation", Int J. Thermophys, 2009, vol. 30 (4):1372-1385.

Chaisuwan, T. et al., "Novel Carbon Aerogel Prepared from Benzoxazine Precursors via Ambient Drying: Effect of Amine Derivatives", PMSE Preprints, vol. 100, Spring 2009, 3 pages.

Chaisuwan, T. et al., "Removal of heavy metals from model wastewater by using polybenzoxazine aerogel", Desalination 256 (2010), pp. 108-114.

Katanyoota, P., et al., "Novel polybenzoxazine-based carbon aerogel electrode for supercapacitors," Materials Science and Engineering B, vol. 167, 2010, pp. 36-42.

Komalwanich, T. et al., "Removal of Heavy Metals from Wastewater by Polybenzoxazine-based Aerogel", PMSE Preprints, vol. 100, Spring 2009, 3 pages.

Yang, J. et al., "Compressive behaviors and morphological changes of resorcinol-formaldehyde aerogel at high strain rates", Microporous and Mesoporous Materials, vol. 133, 2010, pp. 134-140.

* cited by examiner

ORGANIC AEROGEL AND COMPOSITION AND METHOD FOR MANUFACTURING THE ORGANIC AEROGEL

CROSS-REFERENCE TO RELATED APPLICATION

This application claims priority to Korean Patent Application No. 10-2009-0090718 filed on Sep. 24, 2009, and all the benefits accruing therefrom under 35 U.S.C. §119, the content of which in its entirety is herein incorporated by reference.

BACKGROUND

1. Field

This disclosure relates to an organic aerogel and a composition and method for manufacturing an organic aerogel.

2. Description of the Related Art

An aerogel is a mesoporous material having a three-dimensional network structure with nanometer scale pores. Aerogels typically exhibit adiabatic (insulating) and sound absorption properties, and may be used in a variety of applications. For example, aerogels may be used in cooling devices such as refrigerators or freezers, and as materials for the aerospace industry and building construction.

Aerogels may be classified as inorganic or organic, depending on the materials used to prepare the aerogel. An example of an inorganic aerogel is a silica aerogel. An organic aerogel includes an organic compound with an organic linking group. Organic aerogels are generally more flexible than inorganic aerogels, but the extent of improvement in the flexibility is often subtle, that is, small or difficult to detect.

SUMMARY

An embodiment of the disclosure provides an organic aerogel with improved flexibility and mechanical strength, facilitating large-scale manufacture of an aerogel product.

Another embodiment of the disclosure provides a composition for use in the manufacture of an organic aerogel.

A further embodiment of the disclosure provides a method of preparing an organic aerogel.

According to an embodiment of this disclosure, an organic aerogel including a polymer is provided. The polymer generally comprises a polymeric reaction product of at least one monomer having at least two substituted or unsubstituted acrylamide groups.

According to one embodiment of the disclosure, a composition for manufacturing an organic aerogel is provided, wherein the composition includes at least one monomer having at least two substituted or unsubstituted acrylamide groups and a solvent.

According to a further embodiment, a method for preparation an aerogel is provided, comprising polymerizing at least one monomer having at least two substituted or unsubstituted acrylamide groups to form a wet gel, and drying the wet gel to form an organic aerogel.

Within representative embodiments, the monomer or monomers may be a substituted or unsubstituted bisacrylamide compound or a substituted or unsubstituted trisacrylamide compound.

Within still further representative embodiments, the monomer may be represented by any one of the following Chemical Formulae 1 to 5.

Chemical Formula 1

In Chemical Formula 1, $R_1$ to $R_8$ are independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy, and $R_9$ is a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, or a substituted or unsubstituted C2 to C30 alkenylene.

Chemical Formula 2

In Chemical Formula 2, $R_{10}$ to $R_{15}$ are independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy, and $R_{16}$ and $R_{17}$ are independently a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, or a substituted or unsubstituted C2 to C30 alkenylene.

Chemical Formula 3

In Chemical Formula 3, $R_{18}$ to $R_{29}$ are independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy, and $R_{30}$ is a substituted or unsubstituted C1 to C30 trivalent alkyl, a substituted or unsubstituted C3 to C30 trivalent cycloalkyl, a substituted or unsubstituted C6 to C30 trivalent aryl, a substituted or unsubstituted C7 to C30 trivalent arylalkyl, a substituted or unsubstituted C1 to C30 trivalent heteroalkyl, or a substituted or unsubstituted C2 to C30 trivalent heterocycloalkyl.

Chemical Formula 4

In Chemical Formula 4, $R_{31}$ to $R_{39}$ are independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy, and $R_{40}$ to $R_{42}$ are independently a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, a substituted or unsubstituted C2 to C30 alkenylene, oxygen, or sulfur.

Chemical Formula 5

In Chemical Formula 5, $R_{43}$ to $R_{51}$ and Ra, Rb, and Rc are independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy.

In representative embodiments, the at least one monomer may include methylenebisacrylamide, N,N-hexamethylenebisacrylamide, N,N-(p-phenylene)bisacrylamide, 4,4-methylenebis(phenylacrylamide), N,N-(methylenebis-1,4-phenylene)bis(2-propene amide), 1,4-bis(acryloyl) piperazine, 1,3,5-triacryloylhexahydro-1,3,5-triazine, or a combination comprising one or more of the foregoing.

The polymer may include a moiety represented by the following Chemical Formula 6, a moiety represented by the following Chemical Formula 7, a moiety represented by the following Chemical Formula 8, or a combination of the foregoing.

Chemical Formula 6

Chemical Formula 7

Chemical Formula 8

In Chemical Formulae 6 to 8, $R_{52}$ to $R_{60}$ are independently a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, or a substituted or unsubstituted C2 to C30 alkenylene.

In further representative embodiments, the moieties represented by Chemical Formulae 6, 7, and 8 may include moieties represented by the following Chemical Formula 6a, 7a, and 8a, respectively.

Chemical Formula 6a

Chemical Formula 7a

Chemical Formula 8a

The organic aerogel may have a plurality of mesopores. In further 1.0 embodiments, the organic aerogel has a porosity from about 80 percent to about 99 percent based on the total volume of the aerogel.

Within certain representative embodiments of the compositions discussed above, the solvent may be an organic solvent, such as dimethyl formamide ("DMF"), acetone, 1,4-dioxane, tetrahydrofuran, alcohol, or a combination comprising at least one of the foregoing.

DETAILED DESCRIPTION

This disclosure will be described more fully hereinafter in the following detailed description of the invention, and with reference to the accompanying drawings, in which some but not all embodiments of the disclosure are described. This disclosure may, however, be embodied in many different forms and is not to be construed as limited to the exemplary embodiments set forth herein; rather, these embodiments are provided so that this disclosure will be thorough and complete, and will fully convey the scope of the invention to those skilled in the art. Like reference numerals and variables refer to like elements throughout.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs.

As used herein, when a definition is not otherwise provided, the term "substituted" refers to replacement of one or more hydrogens (e.g., 1, 2, 3, 4, 5, or 6 hydrogens) in a compound with one or more substituents independently selected from a C1 to C30 alkyl, a C2 to C30 alkenyl, a C2 to C30 alkynyl, a C6 to C30 aryl, a C7 to C30 arylalkyl, a C1 to C4 oxyalkyl, a C1 to C30 heteroalkyl, a C3 to C30 heteroarylalkyl, a C3 to C30 cycloalkyl, a C3 to C15 cycloalkenyl, a C6 to C30 cycloalkynyl, a C2 to C30 heterocycloalkyl, a halogen (F, Cl, Br, or I), a hydroxy, an alkoxy, a nitro, a cyano, an amino, an azido, an amidino, a hydrazino, a hydrazono, a carbonyl, a carbamyl, a thiol, an ester, a carboxyl or a salt thereof, sulfonic acid or a salt thereof, and phosphoric acid or a salt thereof.

"Alkyl," as used herein, is to a straight or branched chain saturated aliphatic hydrocarbon. Alkyl groups include, for example, groups having from 1 to 30 carbon atoms ("C1 to C30 alkyl"). "Alkenyl" is a straight or branched chain hydrocarbon that comprises at least one carbon-carbon double bond; and "alkynyl" is to a straight or branched chain hydrocarbon that has one or more unsaturated carbon-carbon bonds, at least one of which is a triple bond.

An "oxyalkyl" group is an alkyl group to which at least one oxygen atom is covalently attached (e.g., via a single bond, forming a hydroxyalkyl or ether group, or double bond, forming a ketone or aldehyde moiety).

A "cycloalkyl" is a group that comprises one or more saturated rings in which all ring members are carbon, such as cyclopropyl, cyclobutyl, cyclopentyl, cyclohexyl, cycloheptyl, cyclooctyl, or adamantyl. Partially saturated variants of the foregoing are referred to herein as cycloalkenyl groups (which comprise at least one carbon-carbon double bond, such as cyclohexenyl) or cycloalkynyl groups (which comprise at least one carbon-carbon triple bond). Cycloalkyl, cycloalkenyl, and cycloalkynyl groups do not comprise an aromatic ring or a heterocyclic ring. When numbers of carbon atoms are specified (e.g., C3-C15 cycloalkyl), such numbers refer to the number of ring members present in the one or more rings.

A "heteroalkyl" group is an alkyl group that comprises at least one heteroatom covalently bonded to one or more carbon atoms of the alkyl group. Each heteroatom is independently chosen from nitrogen (N), oxygen (O), sulfur (S), and phosphorus (P).

"Alkoxy" is a type of heteroalkyl group, which is an alkyl moiety that is linked via an oxygen (i.e., —O-alkyl). Nonlimiting examples of C1-C30 alkoxy groups include methoxy groups, ethoxy groups, propoxy groups, isobutyloxy groups, sec-butyloxy groups, pentyloxy groups, iso-amyloxy groups, and hexyloxy groups.

A "heterocycloalkyl" group is a monovalent group that comprises one or more rings, none of which is aromatic, and at least one of which comprises at least one heteroatom (e.g., one, two, or three heteroatoms) as a ring member. In a C2-C30 heterocycloalkyl group, the total number of carbon ring members ranges from 2 to 30, with remaining ring members independently chosen from nitrogen (N), oxygen (O), sulfur (S), and phosphorus (P).

A "C6-C30 aryl group" is a monovalent carbocyclic ring system that includes one or more aromatic rings, in which all ring members are carbon, and in which the total number of ring atoms ranges from 6 to 30. Multiple rings, if present, may be pendent, spiro, or fused. Representative aryl groups include, for example, phenyl, naphthyl, and tetrahydronaphthyl groups.

An "arylalkyl" group is an aryl group linked via an alkylene moiety. The specified number of carbon atoms (e.g., C7 to C30) refers to the total number of carbon atoms present in both the aryl and the alkylene moieties. Representative arylalkyl groups include, for example, benzyl groups.

A "heteroaryl" group is a monovalent carbocyclic ring system that includes one or more aromatic rings, in which at least one ring member (e.g., one, two or three ring members) is a heteroatom. In a C3-C30 heteroaryl, the total number of ring carbon atoms ranges from 3 to 30, with remaining ring atoms being heteroatoms. Multiple rings, if present, may be pendent, spiro or fused. The heteroatom(s) are generally independently selected from nitrogen (N), oxygen (O), P (phosphorus), and sulfur (S).

A "heteroarylalkyl" group is a heteroaryl group linked via an alkylene moiety. The specified number of carbon atoms (e.g., C3 to C30) refers to the total number of carbon atoms present in both the aryl and the alkylene moieties, with remaining ring atoms being heteroatoms as discussed above.

Throughout the specification, reference is made to various bivalent moieties. Such moieties are the same as the monovalent groups that are similarly named, and are typically indicated with an "ene" suffix. For example, a C1 to C30 alkylene group is a bivalent linking group having the same structure as a C1 to C30 alkyl group, a C6 to C30 arylene group is a bivalent linking group having the same structure as a C6 to C30 aryl group, and a C1 to C30 heteroalkylene group is a bivalent linking group having the same structure as a C1 to C30 heteroalkyl group.

Hereinafter, an organic aerogel according to an embodiment is described.

The organic aerogel according to an embodiment includes a polymer having a plurality of mesopores.

The polymer is obtained by polymerizing at least one monomer (e.g., 1, 2, 3, 4, or 5 different monomers), each monomer having at least two substituted or unsubstituted acrylamide groups.

Representative examples of the monomer include a bisacrylamide compound (i.e., a compound having two substituted or unsubstituted acrylamide groups) or a trisacrylamide compound (i.e., a compound having three substituted or unsubstituted acrylamide groups). However, the monomer may include four or more substituted or unsubstituted acrylamide groups without limitation. It will be apparent that different monomers may be combined in the formation of a polymeric reaction product.

In certain embodiments, the bisacrylamide compound may be represented by, for example, the following Chemical Formula 1.

Chemical Formula 1

In Chemical Formula 1, $R_1$ to $R_8$ are independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy.

In Chemical Formula 1, $R_9$ is a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, or a substituted or unsubstituted C2 to C30 alkenylene.

Nonlimiting examples of compounds represented by Chemical Formula 1 may include methylenebisacrylamide, N,N-hexamethylenebisacrylamide, N,N-(p-phenylene) bisacrylamide, 4,4-methylenebis(phenylacrylamide), N,N-(methylenebis-1,4-phenylene)bis(2-propene amide), and the like.

The methylenebisacrylamide, N,N-hexamethylenebisacrylamide, N,N-(p-phenylene)bisacrylamide, 4,4-methylenebis(phenylacrylamide), and N,N-(p-phenylene)bismethacrylamide may be respectively represented by the following Chemical Formulae 1a to 1e.

Chemical Formula 1a

-continued

Chemical Formula 1b

Chemical Formula 1c

Chemical Formula 1d

Chemical Formula 1e

In further representative embodiments, the bisacrylamide compound may be, for example, represented by the following Chemical Formula 2.

Chemical Formula 2

In Chemical Formula 2, $R_{10}$ to $R_{15}$ are independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy.

In Chemical Formula 2, $R_{16}$ and $R_{17}$ are independently a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, or a substituted or unsubstituted C2 to C30 alkenylene.

Within certain representative embodiments, a compound represented by Chemical Formula 2 may include 1,4-bis(acryloyl)piperazine represented by Chemical Formula 2a.

Chemical Formula 2a

In other embodiments, the trisacrylamide compound may include a compound represented by the following Chemical Formulae 3 to 5.

Chemical Formula 3

In Chemical Formula 3, $R_{18}$ to $R_{29}$ are independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy.

In Chemical Formula 3, $R_{30}$ is a substituted or unsubstituted C1 to C30 trivalent alkyl, a substituted or unsubstituted C3 to C30 trivalent cycloalkyl, a substituted or unsubstituted C6 to C30 trivalent aryl, a substituted or unsubstituted C7 to C30 trivalent arylalkyl, a substituted or unsubstituted C1 to C30 trivalent heteroalkyl, or a substituted or unsubstituted C2 to C30 trivalent heterocycloalkyl.

In the above Chemical Formula 3, $R_{30}$ may be, for example, wherein X is selected from C, Si, and N, and each asterisk ("*") represents a point of attachment to an adjacent nitrogen.

Chemical Formula 4

In Chemical Formula 4, $R_{31}$ to $R_{39}$ are independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy.

In Chemical Formula 4, $R_{40}$ to $R_{42}$ are independently a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, a substituted or unsubstituted C2 to C30 alkenylene, oxygen, or sulfur.

Nonlimiting examples of compounds represented by Chemical Formula 4 may include 1,3,5-triacryloylhexahydro-1,3,5-triazine represented by Chemical Formula 4a.

Chemical Formula 4a

In further representative embodiments, the trisacrylamide compound may be represented by the following Chemical Formula 5.

Chemical Formula 5

In Chemical Formula 5, $R_{43}$ to $R_{51}$ and Ra, Rb, and Rc are independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy.

Within certain embodiments, one or more bisacrylamide or trisacrylamide compounds as described above undergo a polymerization reaction to provide a polymer having a three-dimensional network structure. In representative embodiments, the polymer may include a moiety represented by the following Chemical Formula 6, a moiety represented by the following Chemical Formula 7, a moiety represented by the following Chemical Formula 8, or a combination thereof.

Chemical Formula 6

Chemical Formula 7

Chemical Formula 8

Chemical Formula 8a

In Chemical Formulae 6 to 8, $R_{52}$ to $R_{60}$ are independently a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, or a substituted or unsubstituted C2 to C30 alkenylene.

The moieties represented by Chemical Formulae 6, 7, and 8 may, within certain embodiments, include moieties represented by the following Chemical Formulae 6a, 7a, and 8a, respectively.

Chemical Formula 6a

Chemical Formula 7a

A polymer as described above is then used in the preparation of an aerogel, using techniques as discussed in more detail below.

The organic aerogel has a plurality of mesopores in a polymer structure. The mesopores are fine pores having a size of about 2 nm to about 50 nm. In general, the organic aerogel further has porosity of about 80 to 99% based on the total volume of the polymer. In certain embodiments, the organic aerogel may exhibit a high specific surface area (e.g., from about 200 m²/g to about 800 m²/g) as a result of the fine sized pores and high porosity.

In further embodiments, the organic aerogel exhibits a high cross-linking density, due to polymerization of a monomer having two or more acrylamide groups such as the bisacrylamide monomer and trisacrylamide monomer.

Since the organic aerogel has a microstructure forming branch-shaped clusters from a plurality of mesopores, it has high structural strength and flexibility, and mesopores are not collapsed during their preparation process. This allows the preparation of an aerogel with a predetermined size of pore, a high specific surface area, and desired adiabatic properties.

Hereinafter, a representative method of preparing the above organic aerogel is described.

A composition for manufacturing the organic aerogel is polymerized to prepare a wet gel.

The composition for manufacturing an organic aerogel includes a solution obtained by mixing the monomer or monomers having at least two substituted or unsubstituted acrylamide groups, a reaction initiator, and a catalyst in a solvent.

The monomer is generally as described above.

The reaction initiator may be, for example, a radical initiator (i.e., any compound capable of generating radicals). Representative radical initiators include, for example, ammonium persulfate.

In certain embodiments, the catalyst may be, for example, an acid catalyst such as hydrochloric acid (HCl), hydrogen bromide (HBr), sulfuric acid (H₂SO₄), acetic acid, and p-toluene sulfonic acid, or a combination comprising at least one of the foregoing; a base catalyst such as sodium hydroxide (NaOH), sodium hydrogen carbonate (NaHCO₃), potassium hydroxide (KOH), potassium hydrogen carbonate (KHCO3), ammonium hydroxide (NH₄OH), an amine compound, or a combination comprising at least one of the foregoing.

In further embodiments, the solvent may be an organic solvent such as dimethyl formamide, acetone, 1,4-dioxane, tetrahydrofuran, dimethylsulfoxide, toluene, benzene, dichlorobenzene, acetonitrile, alcohol, or a combination comprising at least one of the foregoing.

After the solution undergoes a radical reaction to yield a wet gel, an aerogel may be obtained by a sol-gel reaction.

The wet gel may undergo a solvent exchange reaction. The solvent may include any solvent having good liquid compatibility with carbon dioxide, without limitation. For example, acetone, 1,4-dioxane, tetrahydrofuran, ethanol, methanol, isopropanol, and the like may be used. However, when the wet gel is dried under atmospheric pressure or the solvent used during preparation of the wet gel has sufficient compatibility with carbon dioxide, any solvent exchange process may be omitted.

Subsequently, the wet gel is dried. The drying is performed, for example, by supercritical drying, atmospheric pressure drying, lyophilizing (i.e., reduced pressure drying), or a combination thereof.

Supercritical drying uses supercritical carbon dioxide. First, liquid carbon dioxide is supplied in a high-pressure reactor to remove solvent in a wet gel. Then the temperature and pressure of the high-pressure reactor are raised over the threshold point of carbon dioxide, and the carbon dioxide is slowly ejected (e.g., vented) under reduced pressure. The supercritical drying may be preformed at room temperature (e.g., at about 20° C. to about 25° C.), and has good processability and safety.

Atmospheric pressure drying involves drying the wet gel by heating at atmospheric pressure. When the solvent is removed by atmospheric pressure drying the resultant product is called a xerogel, which is a type of aerogel.

Lyophilizing is a method of removing solvent by freezing the wet gel including a solvent (e.g., an aqueous solution) and reducing the pressure to sublimate frozen solvent (e.g., ice). When the solvent is removed by lyophilizing the resultant product is called a cryogel, which is a type of aerogel.

The organic aerogel according to a representative embodiment undergoes negligible shrinkage during solvent exchange and drying, and maintains mesopores after drying. In contrast, an organic aerogel prepared using a monomer having one acrylamide group exhibits shrinkage of about 70% or more during solvent exchange and drying, resulting in the collapse of a plurality of pores. Accordingly, an organic aerogel provided herein exhibits improved properties.

Hereinafter, this disclosure is illustrated in more detail with reference to examples. However, they are exemplary embodiments of this disclosure and are not limiting.

Preparation of Representative Organic Aerogels

EXAMPLE 1

1.0 g of methylenebisacrylamide is dissolved in 6.5 mL of N,N-dimethyl formamide ("DMF") in a cylindrical polypropylene vial, and 1.0 mL of ammonium persulfate (1.0 M, aqueous solution) as a radical initiator and 0.02 mL of tetramethylethylene diamine as catalyst are added. The mixture is vigorously agitated at room temperature for 1 minute. The reaction temperature is then slowly increased over 10 minutes to 60° C. Gel formation is confirmed by interface fluidity, and the resultant wet gel is aged at room temperature for several hours to days.

The wet gel is solvent-exchanged with acetone, which has good compatibility with liquid carbon dioxide. Then liquid carbon dioxide is added to the wet gel in a high-pressure reactor to remove the acetone from the wet gel. When the acetone is completely removed from the wet gel, the temperature and pressure are raised over the threshold point of carbon dioxide. Then, the carbon dioxide is slowly ejected to reduce the pressure while maintaining the temperature above the threshold temperature.

EXAMPLE 2

An organic aerogel is prepared according to the same process as in Example 1, except that 1,3,5-triacryloylhexahydro-1,3,5-triazine is used instead of methylenebisacrylamide.

EXAMPLE 3

An organic aerogel is prepared according to the same process as in Example 1, except that a combination of 1,3,5-triacryloylhexahydro-1,3,5-triazine and methylenebisacrylamide (in a mole ratio of 1:0.1) is used instead of methylenebisacrylamide.

EXAMPLE 4

An organic aerogel is prepared according to the same process as in Example 1, except that a combination of 1,3,5-triacryloylhexahydro-1,3,5-triazine and methylenebisacrylamide (in a mole ratio of 1:0.5) is used instead of methylenebisacrylamide.

EXAMPLE 5

An organic aerogel is prepared according to the same process as in Example 1, except that a combination of 1,3,5-triacryloylhexahydro-1,3,5-triazine and methylenebisacrylamide (in a mole ratio of 1:1) is used instead of methylenebisacrylamide.

EXAMPLE 6

An organic aerogel is prepared according to the same process as in Example 1, except that a combination of 1,3,5-triacryloylhexahydro-1,3,5-triazine and methylenebisacrylamide (in a mole ratio of 1:1.5) is used instead of methylenebisacrylamide.

EXAMPLE 7

An organic aerogel is prepared according to the same process as in Example 1, except that a combination of 1,3,5-triacryloylhexahydro-1,3,5-triazine and methylenebisacrylamide (in a mole ratio of 1:3) is used instead of methylenebisacrylamide.

EXAMPLE 8

An organic aerogel is prepared according to the same process as in Example 1, except that a combination of 1,3,5-triacryloylhexahydro-1,3,5-triazine and methylenebisacrylamide (in a mole ratio of 2:3) is used instead of methylenebisacrylamide.

EXAMPLE 9

An organic aerogel is prepared according to the same process as in Example 1, except that a combination of 1,3,5-triacryloylhexahydro-1,3,5-triazine and N,N-(p-phenylene)bisacrylamide (in a mole ratio of 2:3) is used instead of methylenebisacrylamide.

EXAMPLE 10

An organic aerogel is prepared according to the same process as in Example 1, except that a combination of 1,3,5-triacryloylhexahydro-1,3,5-triazine and N,N-(methylenebis- 1,4-phenylene)bis(2-propene amide) (in a mole ratio of 2:3) is used instead of methylenebisacrylamide.

COMPARATIVE EXAMPLE 1

25.4 cm$^3$ of pure methanol (CH$_3$OH) are added to 38 cm$^3$ of tetramethoxysilane (Si(OCH$_3$)$_4$). The mixture is agitated for 10 minutes. The amounts used correspond to 60% by volume of Si(OCH$_3$)$_4$ in CH$_3$OH.

The hydrolysis of the tetramethoxysilane is carried out, with continuous agitation, by adding 21.6 cm$^3$ of distilled water (an amount slightly greater than the stoichiometric amount according to reaction (1)).

$$Si(OCH_3)_4 + 4H_2O \rightarrow Si(OH)_4 + 4CH_3OH \quad (1)$$

The duration of the hydrolysis is 15 minutes. The solution obtained is transferred into a Pyrex® glass tube (φ: 21.5 mm; h: 250 mm) and placed in an autoclave having a total capacity of 1,000 cm$^3$. 250 cm$^3$ of pure methanol are also introduced into the autoclave so as to be able to achieve the required hypercritical conditions (V M=3.93 cm$^3$g$^{-1}$; % H$_2$O=8.10).

The autoclave is heated at a rate of 100° C./h. When the temperature reaches 270° C., the solvent is slowly removed. The duration of the removal is 2 hours. When the removal has ended, the autoclave is purged several times with a dry gas (argon) for 15 minutes. The silica aerogel is withdrawn after the autoclave has cooled to ambient temperature. The aerogel is in the form of a slightly opaque, monolithic cylindrical bar. A silica aerogel is prepared in the same manner, except that the starting amounts correspond to 50% by volume of Si(OCH$_3$)$_4$ in CH$_3$OH. A slightly opaque, monolithic cylindrical bar of aerogel is again obtained.

COMPARATIVE EXAMPLE 2

A typical formulation contained 0.29 M resorcinol, 0.57 M formaldehyde, and 1-6 mM sodium carbonate for a total of 5% w/v reactants. RF solutions were poured into glass vials, sealed, and cured for 7 days at 85-95° C. Upon removal from their containers, the gels were placed in a dilute acid solution at 40-50° C. to maximize the cross-link density through further condensation of hydroxymethyl (—CH$_2$OH) groups.

COMPARATIVE EXAMPLE 3

An organic aerogel is prepared according to the same process as in Example 1, except that monoacrylamide is used instead of methylenebisacrylamide.

COMPARATIVE EXAMPLE 4

An organic aerogel is prepared according to the same process as in Example 1, except that a combination of monoacrylamide and methylenebisacrylamide (in a mole ratio of 1:2) instead of methylenebisacrylamide is used during preparation of a wet gel.

COMPARATIVE EXAMPLE 5

An organic aerogel is prepared according to the same process as in Example 1, except that a combination of acrylamide and 1,3,5-triacryloylhexahydro-1,3,5-triazine (in a mole ratio of 3:1) is used instead of methylenebisacrylamide during preparation of a wet gel.

Evaluation

The representative organic aerogels according to Examples 1 to 10 and the aerogels of Comparative Examples 1 to 5 are evaluated with respect to average pore sizes, specific surface areas, and thermal conductivity.

Table 1 shows the average pore sizes and specific surface areas determined for each of the above representative aerogels and comparative examples.

The average pore sizes were measured using a Barrett-Joyner-Halenda ("BJH") adsorption-desorption isotherm, and specific surface areas were measured with a specific surface analyzer, TriStar3200 (Micromeritics Instruments, USA), at 77K.

TABLE 1

|  | Average pore size (nm) | Specific surface area (m$^2$/g) |
| --- | --- | --- |
| Example 1 | 22.41 | 448.96 |
| Example 2 | 14.01 | 558.45 |
| Example 3 | 12.87 | 624.54 |
| Example 4 | 12.29 | 622.92 |
| Example 5 | 14.53 | 595.69 |
| Example 6 | 14.44 | 578.51 |
| Example 7 | 16.25 | 551.49 |
| Example 8 | 9.18 | 481.76 |
| Example 9 | 18.18 | 532.64 |
| Example 10 | 20.37 | 426.42 |
| Comparative Example 1 | 18 | ~700 |
| Comparative Example 2 | 6.27 | 311.92 |
| Comparative Example 3 | Measurement unavailable | Measurement unavailable |
| Comparative Example 4 | 10.82 | 57.74 |
| Comparative Example 5 | 12.69 | 182.25 |

The aerogel according to Comparative Example 3 shows shrinkage of 70% or more before the solvent exchange process, and is broken during the solvent exchange process, so an aerogel could not be formed.

Referring to Table 1, the representative organic aerogels according to Examples 1-10 show average pore sizes within the range of 2 nm to 50 nm. These organic aerogels have larger specific surface area than the organic aerogels according to Comparative Examples 2, 4, and 5, and similar specific surface areas to the aerogel according to Comparative Example 1.

Table 2 shows the results of thermal conductivity analyses.

The thermal conductivity is measured according to modified hot-wire method (Mathis TCi) using a thermal conductivity measurer.

TABLE 2

|  | Thermal conductivity (mW/mK) |
| --- | --- |
| Example 2 | 17.0 |
| Example 8 | 16.0 |
| Example 9 | 14.3 |
| Example 10 | 13.1 |
| Comparative Example 1 | 18.0 |
| Comparative Example 2 | 24.5 |

The representative organic aerogels according to Examples 2, 8, 9, and 10 show lower thermal conductivity than the aerogels according to the comparative examples, and exhibit a thermal conductivity that is similar to or lower than that of the inorganic aerogel according to Comparative Example 1. Inorganic aerogels typically have low flexibility, while the organic aerogels according to Examples 2, 8, 9, and 10 have high flexibility and strength. These organic aerogels further exhibit a specific surface area and thermal conductivity that is at least as good as that of an inorganic aerogel.

Figure 1:
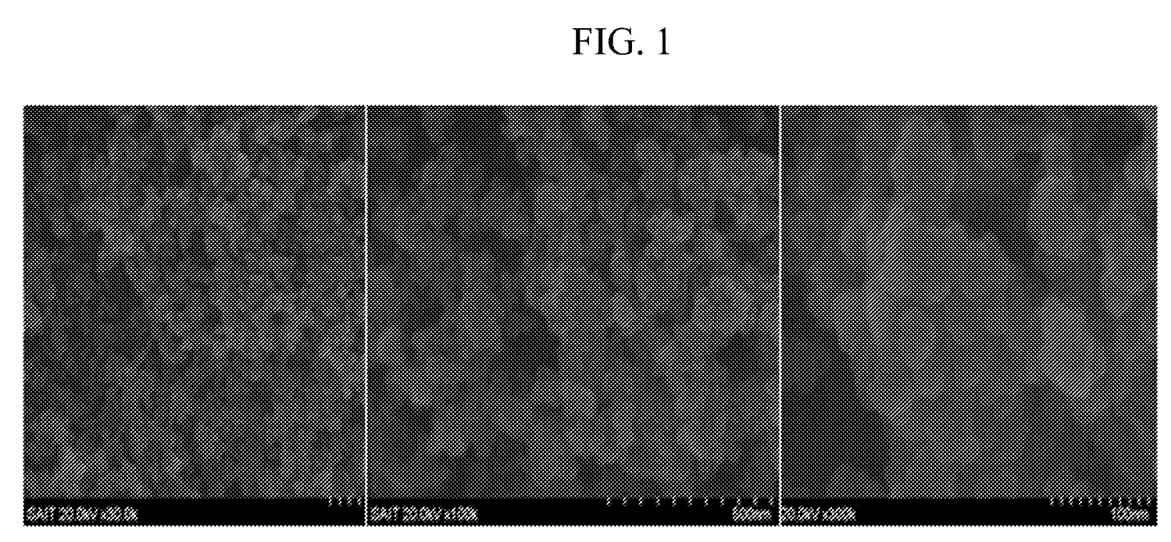
FIG. 1 is a scanning electron microscope photograph of the representative organic aerogel according to Example 3.
Figure 2:
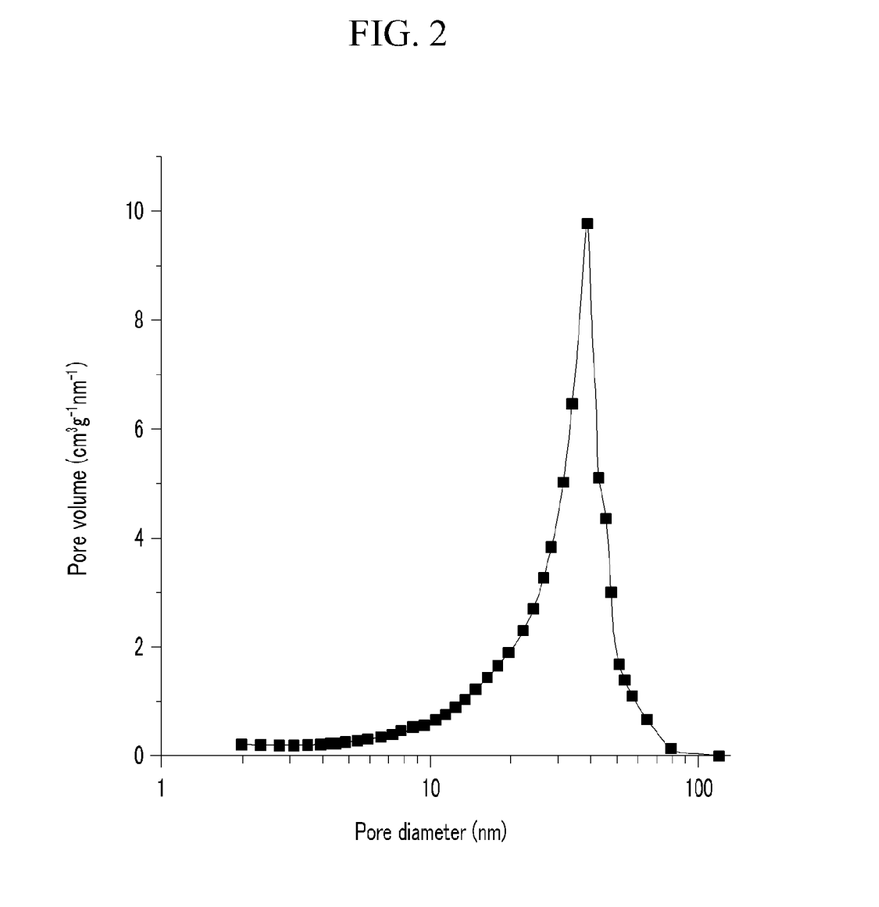
FIG. 2 is a graph of pore volume (cm$^3$/g/nm vs. pore diameter (nm), showing a pore size distribution of the representative organic aerogel according to Example 3.
Figure 3:
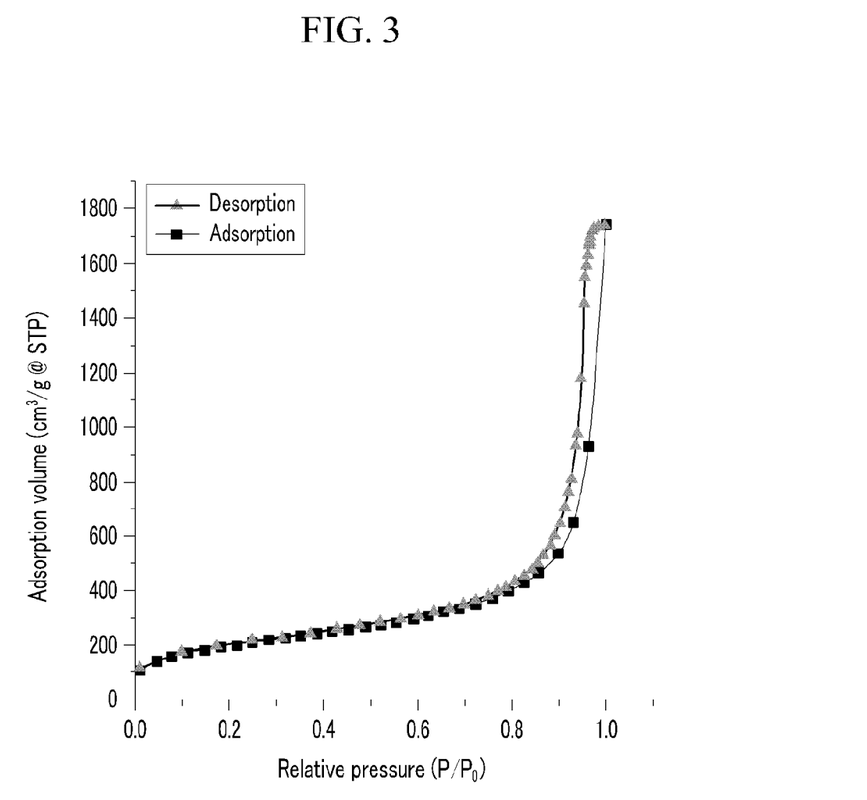
FIG. 3 is a graph of adsorption volume (cm$^3$/g at standard temperature and pressure) vs. relative pressure (P/P$_0$), showing a nitrogen adsorption-desorption isotherm of the representative organic aerogel according to Example 3.

Referring to FIGS. 1 to 3, the representative organic aerogels according to the examples are further illustrated.

FIG. 1 is a scanning electron microscope (SEM) of the representative organic aerogel according to Example 3, FIG. 2 is a graph showing a pore size distribution of the representative organic aerogel according to Example 3, and FIG. 3 is a graph showing a nitrogen ($N_2$) adsorption-desorption isotherm of the representative organic aerogel according to Example 3.

Referring to FIG. 1, the representative organic aerogel according to Example 3 has a plurality of fine pores (black regions).

Referring to FIG. 2, the representative organic aerogel according to Example 3 exhibits high uniformity of pore size, indicating that pores are not collapsed but are rather maintained during the solvent exchange process and drying process.

Referring to FIG. 3, nitrogen adsorption or desorption is seen to vary according to pressure, indicating that the organic aerogel has fine pores.

While this disclosure has been described in connection with what is presently considered to be practical exemplary embodiments, it is to be understood that the invention is not limited to the disclosed embodiments, but, on the contrary, is intended to include various modifications and equivalent arrangements included within the spirit and scope of the appended claims.

What is claimed is:

1. An organic aerogel comprising a polymeric reaction product of at least one monomer having at least three substituted or unsubstituted acrylamide groups, or a polymeric reaction product of at least one monomer having two substituted or unsubstituted acrylamide groups and at least one monomer having at least three substituted or unsubstituted acrylamide groups.

2. The organic aerogel of claim 1, wherein the at least one monomers having at least three substituted or unsubstituted acrylamide groups is a substituted or unsubstituted trisacrylamide compound, and the at least one monomer having two substituted or unsubstituted acrylamide groups is a substituted or unsubstituted bisacrylamide compound.

3. The organic aerogel of claim 2, wherein the substituted or unsubstituted bisacrylamide compound is represented by one of the following Chemical Formulae 1 and 2, and the substituted or unsubstituted trisacrylamide compound is represented by one of the following Chemical Formulae 3 to 5:

Chemical Formula 1 wherein, in Chemical Formula 1, $R_1$ to $R_8$ are independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy, and $R_9$ is a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, or a substituted or unsubstituted C2 to C30 alkenylene, Chemical Formula 2 wherein, in Chemical Formula 2, $R_{10}$ to $R_{15}$ are independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy, and $R_{16}$ and $R_{17}$ are independently a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, or a substituted or unsubstituted C2 to C30 alkenylene, Chemical Formula 3 wherein, in Chemical Formula 3, $R_{18}$ to $R_{29}$ are independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy, and $R_{30}$ is a substituted or unsubstituted C1 to C30 trivalent alkyl, a substituted or unsubstituted C3 to C30 trivalent cycloalkyl, a substituted or unsubstituted C6 to C30 trivalent aryl, a substituted or unsubstituted C7 to C30 trivalent arylalkyl, a substituted or unsubstituted C1 to C30 trivalent heteroalkyl, or a substituted or unsubstituted C2 to C30 trivalent heterocycloalkyl, Chemical Formula 4 wherein, in Chemical Formula 4, $R_{31}$ to $R_{39}$ are independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy, and $R_{40}$ to $R_{42}$ are independently a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, a substituted or unsubstituted C2 to C30 alkenylene, oxygen, or sulfur, and Chemical Formula 5 wherein, in Chemical Formula 5, $R_{43}$ to $R_{51}$ and Ra, Rb, and Rc are independently selected from hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy.

4. The organic aerogel of claim 2, wherein the substituted or unsubstituted bisacrylamide compound is methylenebisacrylamide, N,N-hexamethylenebisacrylamide, N,N-(p-phenylene)bisacrylamide, 4,4-methylenebis(phenylacrylamide), N,N-(methylenebis-1,4-phenylene)bis(2-propene amide), or 1,4-bis(acryloyl)piperazine, and the substituted or unsubstituted trisacrylamide compound is 1,3,5-triacryloyl-hexahydro-1,3,5-triazine.

5. The organic aerogel of claim 1, wherein the polymer comprises a moiety represented by the following Chemical Formula 6, a moiety represented by the following Chemical Formula 7, a moiety represented by the following Chemical Formula 8, or a combination of the foregoing:

Chemical Formula 6

Chemical Formula 7

Chemical Formula 8 wherein, in Chemical Formulae 6 to 8, $R_{52}$ to $R_{60}$ are independently a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, or a substituted or unsubstituted C2 to C30 alkenylene.

6. The organic aerogel of claim 5, wherein the moieties represented by Chemical Formulae 6, 7, and 8 are selected from the following Chemical Formulae 6a, 7a, and 8a, respectively:

Chemical Formula 6a

Chemical Formula 7a

Chemical Formula 8a

7. The organic aerogel of claim 1, wherein the organic aerogel has a porosity of about 80 to 99% based on total volume of the organic aerogel.

8. The organic aerogel of claim 7, wherein the specific surface area of the organic aerogel ranges from about 200 to 800 m²/g.

9. A composition for an organic aerogel comprising
at least one monomer having at least three substituted or unsubstituted acrylamide groups, or a combination of monomers comprising at least one monomer having two substituted or unsubstituted acrylamide groups, and at least one monomer having at least three substituted or unsubstituted acrylamide groups, and
a solvent.

10. The composition for an organic aerogel of claim 9, wherein each of the at least one monomer having at least three substituted or unsubstituted acrylamide groups is a substituted or unsubstituted trisacrylamide compound, and the at least one monomer having two substituted or unsubstituted acrylamide groups is a substituted or unsubstituted bisacrylamide compound.

11. The composition for an organic aerogel of claim 10, wherein the substituted or unsubstituted bisacrylamide compound is represented by one of the following Chemical Formulae 1 and 2, and the substituted or unsubstituted trisacrylamide compound is represented by one of the following Chemical Formulae 3 to 5:

Chemical Formula 1 wherein, in Chemical Formula 1, $R_1$ to $R_8$ are independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy, and $R_9$ is a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, or a substituted or unsubstituted C2 to C30 alkenylene, Chemical Formula 2 wherein, in Chemical Formula 2, $R_{10}$ to $R_{15}$ are independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy, and $R_{16}$ and $R_{17}$ are independently a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, or a substituted or unsubstituted C2 to C30 alkenylene, Chemical Formula 3 wherein, in Chemical Formula 3, $R_{18}$ to $R_{29}$ are independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy, and $R_{30}$ is a substituted or unsubstituted C1 to C30 trivalent alkyl, a substituted or unsubstituted C3 to C30 trivalent cycloalkyl, a substituted or unsubstituted C6 to C30 trivalent aryl, a substituted or unsubstituted C7 to C30 trivalent arylalkyl, a substituted or unsubstituted C1 to C30 trivalent heteroalkyl, or a substituted or unsubstituted C2 to C30 trivalent heterocycloalkyl, Chemical Formula 4 wherein, in Chemical Formula 4, $R_{31}$ to $R_{39}$ are independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy, and $R_{40}$ to $R_{42}$ are independently a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, a substituted or unsubstituted C2 to C30 alkenylene, oxygen, or sulfur, and Chemical Formula 5 wherein, in Chemical Formula 5, $R_{43}$ to $R_{51}$ and Ra, Rb, and Rc are independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy.

12. The composition for an organic aerogel of claim 10, wherein the substituted or unsubstituted bisacrylamide compound is methylenebisacrylamide, N,N-hexamethylenebisacrylamide, N,N-(p-phenylene)bisacrylamide, 4,4-methylenebis(phenylacrylamide), N,N-(methylenebis-1,4-phenylene)bis(2-propene amide), or 1,4-bis(acryloyl)piperazine, and the substituted or unsubstituted trisacrylamide compound is 1,3,5-triacryloylhexahydro-1,3,5-triazine.

13. The composition for an organic aerogel of claim 9, wherein the solvent comprises an organic solvent.

14. The composition for an organic aerogel of claim 13, wherein the solvent comprises dimethyl formamide, acetone, 1,4-dioxane, tetrahydrofuran, dimethylsulfoxide, toluene, benzene, dichlorobenzene, acetonitrile, alcohol, or a combination thereof.

15. A method of manufacturing an organic aerogel, comprising:
polymerizing at least one monomer having at least three substituted or unsubstituted acrylamide groups, or polymerizing at least one monomer having two substituted or unsubstituted acrylamide groups and at least one monomer having at least three substituted or unsubstituted acrylamide groups to form a wet gel, and
drying the wet gel to form an organic aerogel.

16. The method of claim 15, wherein the at least one monomers having at least three substituted or unsubstituted acrylamide groups is a substituted or unsubstituted trisacrylamide compound, and the at least one monomer having two substituted or unsubstituted acrylamide groups is a substituted or unsubstituted bisacrylamide compound.

17. The method of claim 16, wherein the substituted or unsubstituted bisacrylamide compound is represented by one of the following Chemical Formulae 1 and 2, and the substituted or unsubstituted trisacrylamide compound is represented by one of the following Chemical Formulae 3 to 5:

Chemical Formula 1 wherein, in Chemical Formula 1, $R_1$ to $R_8$ are independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy, and $R_9$ is a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, or a substituted or unsubstituted C2 to C30 alkenylene,

Chemical Formula 2 wherein, in Chemical Formula 2, $R_{10}$ to $R_{15}$ are independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy, and $R_{16}$ and $R_{17}$ are independently a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, or a substituted or unsubstituted C2 to C30 alkenylene,

Chemical Formula 3 wherein, in Chemical Formula 3, $R_{18}$ to $R_{29}$ are independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy, and $R_{30}$ is a substituted or unsubstituted C1 to C30 trivalent alkyl, a substituted or unsubstituted C3 to C30 trivalent cycloalkyl, a substituted or unsubstituted C6 to C30 trivalent aryl, a substituted or unsubstituted C7 to C30 trivalent arylalkyl, a substituted or unsubstituted C1 to C30 trivalent heteroalkyl, or a substituted or unsubstituted C2 to C30 trivalent heterocycloalkyl,

Chemical Formula 4 wherein, in Chemical Formula 4, $R_{31}$ to $R_{39}$ are independently hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy, and $R_{40}$ to $R_{42}$ are independently a substituted or unsubstituted C1 to C30 alkylene, a substituted or unsubstituted C3 to C30 cycloalkylene, a substituted or unsubstituted C6 to C30 arylene, a substituted or unsubstituted C7 to C30 arylalkylene, a substituted or unsubstituted C1 to C30 heteroalkylene, a substituted or unsubstituted C2 to C30 heterocycloalkylene, a substituted or unsubstituted C2 to C30 alkenylene, oxygen, or sulfur, and Chemical Formula 5 wherein, in Chemical Formula 5, $R_{43}$ to $R_{51}$ and Ra, Rb, and Rc are independently selected from hydrogen, a substituted or unsubstituted C1 to C30 alkyl, a substituted or unsubstituted C3 to C30 cycloalkyl, a substituted or unsubstituted C6 to C30 aryl, a substituted or unsubstituted C7 to C30 arylalkyl, a substituted or unsubstituted C1 to C30 heteroalkyl, a substituted or unsubstituted C2 to C30 heterocycloalkyl, a substituted or unsubstituted C2 to C30 alkenyl, a substituted or unsubstituted C1 to C10 alkoxy, a substituted or unsubstituted C2 to C10 carbonyl, or a hydroxy.

\* \* \* \* \*